Oct. 7, 1969 R. R. RADNOR 3,471,720

POWER AMPLIFIER

Filed April 27, 1966

United States Patent Office 3,471,720
Patented Oct. 7, 1969

3,471,720

POWER AMPLIFIER

Richard Rishel Radnor, Witesboro, N.Y., assignor to General Electric Company, a corporation of New York Filed Apr. 27, 1966, Ser. No. 545,604
Int. Cl. H03k *3/26, 23/08*
U.S. Cl. 307—314 5 Claims This invention is directed to providing a power amplifier in which the output electrical power approximates a sinusoidal waveform, is variable in average amplitude, and is reversible in phase. It is particularly useful for producing a synchronized waveform such as in driving two-phase servomotors and similar loads, especially when minimum weight, high efficiency, and low heat dissipation are critical.

Motors such as two-phase induction motors inherently respond to sinusoidal excitation. In general, that part of the excitation which departs from a sinusoidal waveform is dissipated as heat which is wasteful of power and produces high temperatures that are destructive of equipment unless means for heat removal can handle the heat energy produced. Particularly in aircraft and other mobile equipment the use of extensive heat removal equipment is not practical. Therefore, for driving the servo motor, sinusoidal amplifier outputs are substantially a necessity. Class B solid-state amplifiers come sufficiently close to sinusoidal waveforms for the motor, but the amplifiers themselves generate a great deal of heat. While the class B amplifiers are much more efficient than class A amplifiers, their power transistors are operated in a partially conducting condition. in series with the power, for a significant proportion of the operating time. This results in heat dissipation which causes power efficiency and high temperature problems.

It is therefore evident that the usual goals for amplifiers, particularly in mobile systems, of very high efficiency, of small size and weight, and of the highest reliability affordable are seriously complicated when a sinusoidal output waveform is called for.

Where high efficiency, on the order of 90%, is important, magnetic power amplifiers are out of the question because their ballast resistors alone usually dissipate more than half of the applied power. In addition, their size and weight are frequently impractical.

Amplifiers using switching devices such as silicon controlled rectifiers can provide very efficient operation internally with light and compact apparatus. However, the resulting waveforms are non-sinusoidal and therefore generally unsatisfactory for driving servomotors. Furthermore, it has proved difficult and costly to insure reliable SCR amplifier operation. These devices are prone to being triggered by noise spikes and turn-OFF requires current interruption which is very hard to insure.

Accordingly, it is an object of the invention to provide a reliable amplifier for driving a servomotor or the like with very little heat dissipation.

It is a further object of the invention to provide a servo-amplifier, for a servomotor such as a two-phase induction motor, which generates an efficient waveform which is synchronized for the servomotor.

Briefly stated, an amplifier is provided by series power transistors which are synchronously controlled by magnetic amplifiers at the A-C supply frequency. It has been discovered that with the proper kind of control signals, both the transistors and motors can have significantly improved efficiency. It has also been found that small magnetic amplifiers can provide appropriate switching signals. With no power handling required, the magnetic amplifier can be quite small while retaining excellent reliability. The key to efficient operation of the power transistor appears to be avoidance of the normal sharp turn-OFF at the end of a half-cycle or a sharp turn-ON at the beginning of any half-cycle. This appears to automatically result in power signals which, although more truncated than before, act substantially like true sinusoids in a two-phase motor.

The invention, together with further objects and advantages thereof, may best be understood by referring to the following description taken in conjunction with the appended drawings in which like numerals indicate like parts and in which.

Figures 1, 2, 3:
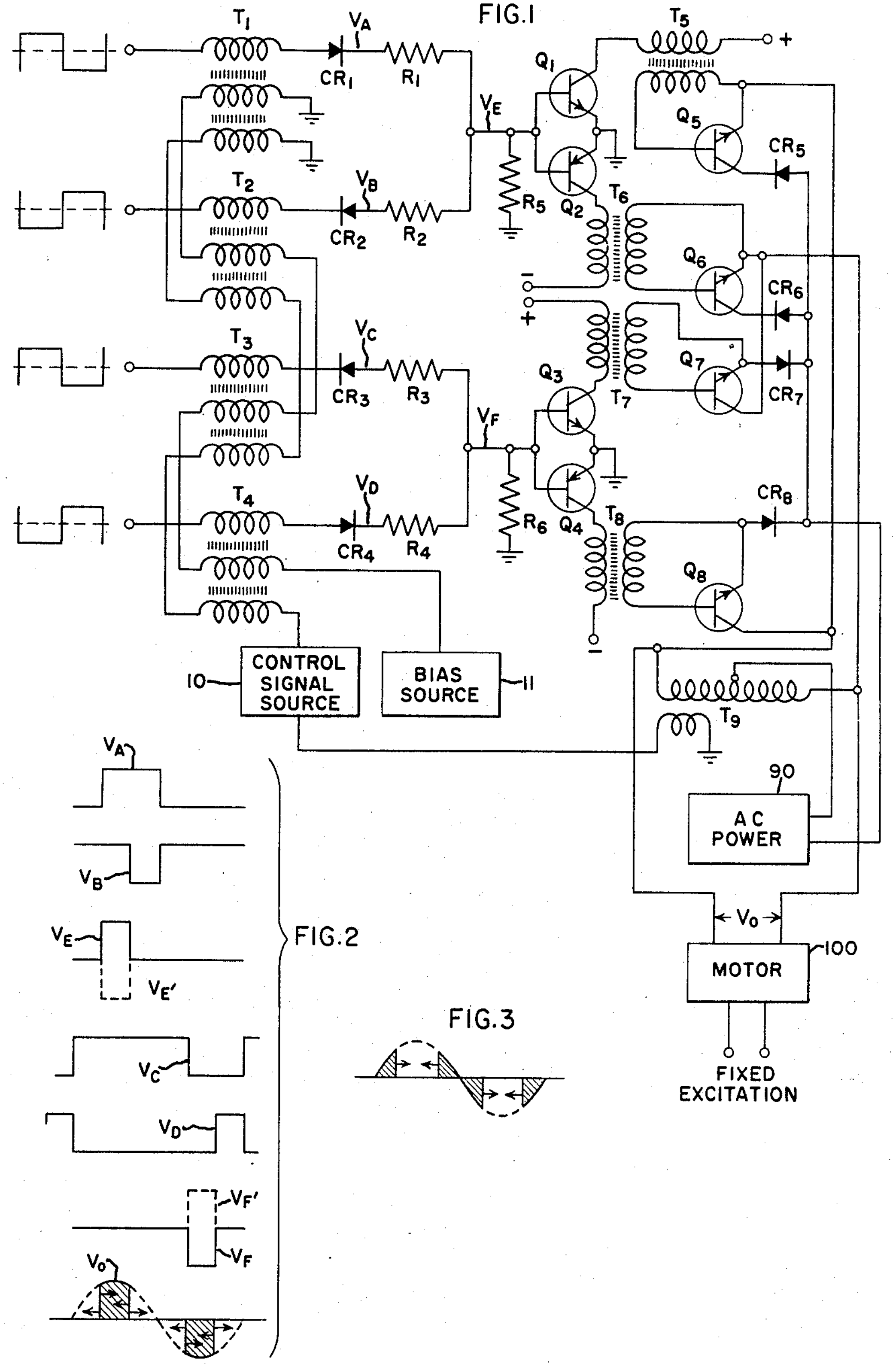
FIGURE 1 is a schematic diagram of one preferred embodiment of the amplifier invention.
FIGURE 2 is a diagram of waveforms illustrating operation of the FIGURE 1 amplifier.

FIGURE 3 contains a diagram of an alternate waveform.

In FIGURE 1, the input is the CONTROL signal from source 10 applied serially to saturable transformers $T_1$, $T_2$, $T_3$ and $T_4$ which operate as magnetic amplifiers. Their output signals switch transistors $Q_1$, $Q_2$, $Q_3$, and $Q_4$ to provide appropriate transformer coupled switching signals for power transistors $Q_5$, $Q_6$, $Q_7$, and $Q_8$. The motor 100 is of a two-phase induction type having one phase connected to an excitation signal which has constant amplitude and a fixed phase displacement of 90° from the A-C power signal from source 90. The latter is fixed also, but power transistors $Q_5$–$Q_8$ provide phase reversing and a variable ON-time so that the torque and speed of motor 100 are controlled.

The control signal source 10 is a conventional servo system preamplifier which generates the control signal in response to a servo command signal (not shown) and a feedback signal from transformer $T_9$ in a conventional manner to provide a variable amplitude, bi-polarity, D-C signal to the saturable transformers $T_1$–$T_4$. So as to provide integration type of operation, the cores of saturable transformer $T_1$–$T_4$ have matched square-loop hysteresis characteristics. Square-wave signals are applied to the transformers, which are synchronized with the A-C power and have the same frequency. The square-waves applied to $T_1$ and $T_3$ are in phase and the square-waves applied to $T_2$ and $T_4$ are 180° out of phase with $T_1$ and $T_3$. A D-C bias is also applied to transformers $T_1$–$T_4$ such that $T_1$ and $T_2$ will fire at 90° for a zero level control. As is evident from the representative FIGURE 2 waveforms, $T_1$ and $T_2$ provide control action for the first A-C half-cycle, and $T_3$ and $T_4$ control the second half-cycle. This division of control follows from the use of diodes $CR_1$, $CR_2$, $CR_3$, and $CR_4$ which are in series with the respective square-waves and poled to provide this division. The resulting signals for these half-cycles are produced by using respective series resistors $R_1$ and $R_2$, both being connected in series with resistor $R_5$, to sum the $T_1$ and $T_2$ signals, and resistors $R_3$ and $R_4$ with resistor $R_6$ for $T_3$ and $T_4$ and the second half-cycle. With a zero level command or control signal, $T_1$ and $T_2$ waveforms $V_A$ and $V_B$ are mirror images of one another and cancel, because of the adjustment of constant current bias source 11. As the control signal varies, it advances the firing time of $T_1$ or $T_2$ and retards the other. As a result, there is a net positive or negative pulse $V_E$ produced across resistor $R_5$, depending on the polarity of the CONTROL signal. If the polarity of the CONTROL signal were reversed, the pulse-width durations of $V_A$ and $V_B$ would be interchanged and $V_{E'}$ would be produced. The pulse is centered in the half-cycle and has a duration which is proportional to the amplitude of the CONTROL signal.

The direction of torque from motor 100 is controlled by DPDT switching of the A-C power from source 90. This function is performed in the first half-cycle by selectively turning ON either power transistor $Q_5$ or $Q_7$.

These transistors are controlled respectively by transformers $T_5$ and $T_7$. By connecting a positive supply bus through transformer $T_5$ and a series npn transistor $Q_1$ to ground, and a negative supply through transformer $T_6$ and a series pnp transistor to ground, circuitry is provided to convert the bipolarity signal across $R_5$ to a two-wire signal. By applying the $R_5$ voltage to the bases of both transistors $Q_1$ and $Q_2$ one and only one will turn ON and cause its transformer to turn ON the corresponding power transistor $Q_5$ or $Q_7$.

During the second half-cycle, the reverse conditions hold. If the $R_5$ signal was positive, a negative signal is produced at $R_6$ by summing resistors $R_3$ and $R_4$. $Q_4$ turns ON and transformer $T_8$ drives $Q_6$ to connect the A-C power to the load during the second half-cycle for the proper time duration.

Diodes $CR_5$, $CR_6$ $CR_7$ and $CR_8$ are connected in series with the respective transistors $Q_5$–$Q_8$ and are poled to permit the desired current flow. The A-C power is applied directly to the power transistors $Q_5$–$Q_8$ in series with auto-transformer $T_9$ which provides voltage doubling and has a pick-off winding for feedback. The particular embodiment illustrated operates with a standard 400 Hz. three-phase power supply. Conveniently, one phase provides the A-C power 90 and the other phases are connected to the fixed excitation terminals so as to produce power with a 90° phase displacement from the A-C power at 90.

A salient feature of the invention is the direct switching of power during each half-cycle under control of saturable transformers. At 400 Hz., the half-cycles are only 1250 microseconds long and there are 1600 power switching operations per second. It has been found that power transistors such as type 2N1724 can function with 95% efficiency with the described control circuits.

The symmetrical output waveform $V_0$ approaches a sine wave at full power which results in minimum motor heating. It has also been found that there is little motor heating at lower power conditions which appears to be due to the symmetrical waveform. FIGURE 3 illustrates an alternate symmetrical waveform for $V_0$ which has similar characteristics. An important characteristic of the waveforms is that there are no fast zero-crossings. In no event is the turning OFF of a power transistor followed immediately by a large reverse current. This permits the transistors to recover from a hard ON condition so that significant lossy reverse currents do not occur.

While only certain preferred features of the invention have been shown by way of illustration, many modifications and changes will occur to those skilled in the art. For example, the switching signals could be generated by transistorized circuits responsive to the CONTROL signal instead of the saturable transformers which operate in a manner similar to magnetic amplifiers. It is, therefore, to be understood that the appended claims are intended to cover all such modifications and changes as fall within the true spirit and scope of the invention.

What is claimed is:

1. A power amplifier comprising:

(a) means for providing an A-C power input;

(b) a set of four power transistors, (1) two of said transistors being adapted to apply respective lines of said power supply means to a first load terminal;

(2) the remaining two transistors being adapted to apply respective lines of said power to a second load terminal, whereby phase reversal is permitted;

(c) a set of four pulse generators for selectively operating said transistors in an ON condition for a variable time duration equal to the duration of input control pulses;

(d) a set of four saturable transformers for generating said control pulses;

(e) means to apply an A-C square wave, synchronous with said A-C power, to said transformers;

(f) means to apply a constant bias signal in series to said transformer so that a first pair of said transformers reach saturation at the midpoint of alternate half-cycles and so that the remaining pair of said transformers reach saturation at the midpoint of the remaining half cycle.

2. A power amplifier for use with a two phase motor comprising:

(a) means for providing an A-C power input;

(b) a set of four power transistors, (1) two of said transistors being adapted to apply respective lines of said power supply means to a first load terminal;

(2) the remaining two transistors being adapted to apply respective lines of said power to a second load terminal, whereby phase reversal is permitted;

(c) four pulse generators for selectively operating said transistors in an ON condition for a variable time duration equal to the duration of input control pulses;

(d) means to apply a reference signal, synchronous with said A-C power, to said four pulse generators, and (e) said selective operation of said transistors being controlled to avoid sharp turn-off and sharp turn-on to provide an output waveform at said load terminals which approaches a sine wave.

3. The power amplifier of claim 2 wherein:

(f) the pairs of transistors comprising said two transistors and also said remaining two transistors are each pair connected in series with the emitter of one connected to the collector of the second.

4. The power amplifier of claim 3 wherein:

(g) said reference signal is an A-C square wave.

5. The power amplifier of claim 4 wherein:

(h) an output transfer is connected between said power transistors and said load terminals, and (i) a two phase motor connected to said load terminals.

References Cited

UNITED STATES PATENTS

| | | | |
|---|---|---|---|
| 2,956,222 | 10/1960 | Hill et al. | 307—314 |
| 3,238,445 | 1/1966 | Sikorra | 323—75 |

JOHN S. HEYMAN, Primary Examiner

B. P. DAVIS, Assistant Examiner

U.S. Cl. X.R.

307—254, 313